US010033718B2

(12) United States Patent
Perrin et al.

(10) Patent No.: US 10,033,718 B2
(45) Date of Patent: Jul. 24, 2018

(54) PAIRING OF BASE AND DETACHABLE DEVICE

(75) Inventors: Steven Richard Perrin, Raleigh, NC (US); Mark Charles Davis, Durham, NC (US); Scott Edwards Kelso, Cary, NC (US); Bin Li, Beijing (CN); Sheng Wang, Beijing (CN)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 977 days.

(21) Appl. No.: 12/985,182

(22) Filed: Jan. 5, 2011

(65) Prior Publication Data

US 2012/0174199 A1 Jul. 5, 2012

(51) Int. Cl.
*H04L 9/32* (2006.01)
*H04L 29/06* (2006.01)
*G06F 1/16* (2006.01)

(52) U.S. Cl.
CPC ........ *H04L 63/0823* (2013.01); *G06F 1/1654* (2013.01); *G06F 1/1632* (2013.01); *H04L 63/107* (2013.01); *H04L 2209/127* (2013.01)

(58) Field of Classification Search
None
See application file for complete search history.

(56) References Cited

U.S. PATENT DOCUMENTS

| | | | |
|---|---|---|---|
| 7,239,865 B2* | 7/2007 | Dyck et al. | 455/411 |
| 7,448,074 B2* | 11/2008 | Kim | 726/5 |
| 7,474,888 B1* | 1/2009 | Davis et al. | 455/411 |
| 7,478,248 B2* | 1/2009 | Ziv et al. | 713/193 |
| 7,823,214 B2* | 10/2010 | Rubinstein et al. | 726/34 |
| 8,249,504 B2* | 8/2012 | Fujii | 455/41.2 |
| 2002/0015283 A1* | 2/2002 | Sallam | G06F 1/1601 361/679.3 |
| 2003/0050009 A1* | 3/2003 | Kurisko | H04L 63/061 455/41.1 |
| 2003/0112585 A1* | 6/2003 | Silvester | G06F 1/1616 361/679.41 |
| 2007/0201389 A1* | 8/2007 | Murayama | 370/310 |
| 2008/0016537 A1* | 1/2008 | Little | H04L 63/0853 725/81 |

(Continued)

FOREIGN PATENT DOCUMENTS

| | | | | |
|---|---|---|---|---|
| CN | 1420502 | | 5/2003 | |
| EP | 1271286 A2 * | | 1/2003 | G06F 1/16 |
| WO | WO 2006043977 A1 * | | 4/2006 | G06F 3/14 |

OTHER PUBLICATIONS

Mark Ryan, "Introduction to the TPM 1.2." Mar. 24, 2009, pp. 1-2.*

(Continued)

*Primary Examiner* — Nadia Khoshnoodi
(74) *Attorney, Agent, or Firm* — Kunzler, PC

(57) ABSTRACT

An apparatus and method for pairing a base and a detachable device. A query module queries a detachable device in response to the detachable device connecting to a base. The detachable device provides a display for the base if the detachable device and base are connected. A determination module determines if the detachable device is paired with the base. A credential module obtains a pairing credential for a pairing in response to the determination module determining that the detachable device is unpaired with the base.

20 Claims, 5 Drawing Sheets

(56) References Cited

U.S. PATENT DOCUMENTS

| | | | |
|---|---|---|---|
| 2009/0240814 A1* | 9/2009 | Brubacher et al. | 709/227 |
| 2009/0304347 A1* | 12/2009 | Hio | 386/52 |
| 2010/0081473 A1* | 4/2010 | Chatterjee | G06F 1/1632 455/559 |
| 2011/0028091 A1* | 2/2011 | Higgins | H04L 63/0492 455/41.2 |
| 2011/0213225 A1* | 9/2011 | Bernstein | G06Q 50/22 600/309 |
| 2011/0222466 A1* | 9/2011 | Pance et al. | 370/316 |
| 2011/0230178 A1* | 9/2011 | Jones et al. | 455/422.1 |
| 2011/0252317 A1* | 10/2011 | Keranen et al. | 715/702 |
| 2011/0320535 A1* | 12/2011 | Donaldson | H04W 4/00 709/204 |

OTHER PUBLICATIONS

Microsoft Inc., "BitLocker Drive Encryption Technical Overview." Jul. 17, 2009 pp. 6-11.*
Saxena et al., "Secure Device Pairing based on a Visual Channel," pp. 4-13 (Year: 2006).*

\* cited by examiner

PAIRING OF BASE AND DETACHABLE DEVICE

FIELD

The subject matter disclosed herein relates to device pairing and more particularly relates to pairing of a base and a detachable device.

BACKGROUND

Description of the Related Art

A computer system may incorporate a detachable device to allow a user to have access to limited computing functionality through the detachable device in a smaller, lighter, more transportable form factor. The detachable device may connect a base of the computer system. Both the base and the detachable device may each include a processor, memory, and communications hardware.

When disconnected from the base, the detachable device may independently provide sufficient functionality to allow the user to access email and messaging accounts, view media content, access schedules, take notes, and perform other tasks. When connected to the base, the user may use the detachable device along with a more extensive resource set available through the base such as a hard disk drive, an optical drive, a keyboard, Input/Output (I/O) ports, and the like.

In addition, both the base and the detachable device may share data. Due to the separability of the detachable device and the base and the capacity of each to share data with the other, a base and/or a detachable device may identify whether they are authorized to be connected before commencing operation with one another.

BRIEF SUMMARY

Based on the foregoing discussion, the inventors have recognized a need for an apparatus and method that pairs a base and a detachable device. Beneficially, such an apparatus and method would pair a base and a detachable device that have not been paired, and may also recognize an existing pairing.

The embodiments of the present invention have been developed in response to the present state of the art, and in particular, in response to the problems and needs in the art that have not yet been fully solved by currently available device pairing methods. Accordingly, the embodiments have been developed to provide an apparatus and method for pairing a base and a detachable device that overcome many or all of the above-discussed shortcomings in the art.

One embodiment, an the apparatus for pairing a base and a detachable device is provided with a plurality of modules configured to functionally execute the necessary steps of querying a detachable device, determining if the detachable device is paired with a base and obtaining a pairing credential for a pairing. These modules in the described embodiments include a query module, a determination module, and a credential module.

The query module queries a detachable device in response to the detachable device connecting to a base. The detachable device provides a display for the base if the detachable device and base are connected. The determination module determines if the detachable device is paired with the base. The credential module obtains a pairing credential for a pairing in response to the determination module determining that the detachable device is unpaired with the base.

One embodiment of the method is also presented for pairing a base and a detachable device. The method in the disclosed embodiments substantially includes the steps necessary to carry out the functions presented above with respect to the operation of the described apparatus.

The method includes querying a detachable device in response to the detachable device connecting to a base. The detachable device provides a display for the base if the detachable device and base are connected. The method also includes determining if the detachable device is paired with the base. The method also includes obtaining a pairing credential for a pairing in response to determining that the detachable device is unpaired with the base.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
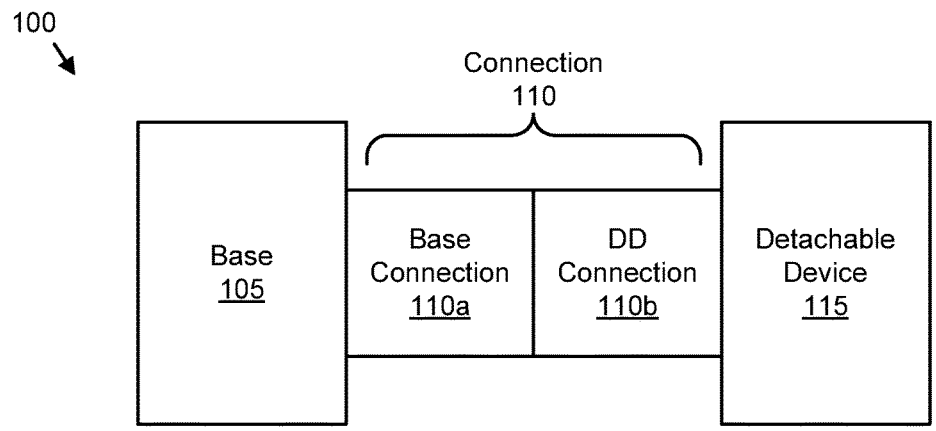
FIG. 1 is a schematic block diagram illustrating one embodiment of a computer system.

As will be appreciated by one skilled in the art, aspects of the embodiments may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having a computer readable program embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of a computer readable program may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of a computer readable program may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable medium(s).

Any combination of one or more computer readable medium(s) may be utilized. The computer readable medium may be a computer readable signal medium or a computer readable storage medium. The computer readable medium may be a tangible computer readable storage medium storing the computer readable code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with a computer readable program embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. A computer readable program embodied on a computer readable medium may be transmitted using any appropriate medium, including but not limited to wireless, wireline, optical fiber cable, Radio Frequency (RF), etc., or any suitable combination of the foregoing.

A computer readable program for carrying out operations for embodiments may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 is a schematic block diagram illustrating one embodiment of a computer system 100. The computer system 100 includes a base 105 and a detachable device 115. The base 105 connects to the detachable device 115 through connection 110 comprising a base connection 110a and a detachable device connection 110b. In one embodiment, the base connection 110a and the detachable device connection 110b are Universal Serial Bus (USB) connections. Alternatively, the base connection 110a and the detachable device connection 110b may be Institute of Electrical and Electronic Engineers (IEEE) 1394 interface (1394) connections, High-Definition, Multimedia Interface (HDMI) connections, custom serial bus connections, custom parallel bus connections, or the like. The detachable device 115 and the base 105 may share data by way of the base connection 110a and the detachable device connection 110b.

In one embodiment, the detachable device 115 provides a display for the base 105 if the detachable device 115 and the base 105 are connected. In addition, the detachable device 115 may provide other functionality for the base 105. In a certain embodiment, the detachable device 115 provides a network connection. In a further embodiment, the detachable device 115 provides the network connection for the base 105 if the base 105 and detachable device 115 are connected.

The base 105 may provide additional resources for use with the detachable device. For example, the base 105 may include a mass storage device such as a hard disk drive, a micromechanical storage device, and optical storage device, a holographic storage device, and the like.

The base 105 may also provide additional input devices such as a keyboard, a mouse, a joystick, a game controller, and the like. In one embodiment, the base 105 includes additional I/O ports such as USB ports, 1394 ports, HDMI ports, external power supply ports, and the like.

In one embodiment, both the base 105 and the detachable device 115 include power sources such as batteries, fuel cells, and the like. In one embodiment, a power source of the base 105 may provide power to the detachable device 115 from a base power source when the base 105 and the detachable device 115 are connected. The detachable device 115 may use a device power source for power when disconnected from the base 105. In one embodiment, the base 105 may power-on and/or initiate a boot sequence of the detachable device 115.

The base 105 may monitor the connection 110 between the base 105 and the detachable device 115. In addition, the detachable device 115 may also monitor the connection 110 between the base 105 and the detachable device 115. Thus the detachable device 115 is aware of a connection event such as the detachable device 115 disconnecting from the base 105 and the detachable device 115 connecting to the base 105. The base 105 is also aware of each connection event. In one embodiment, the detachable device 115 and/or base 105 may include a coupled connection sensor. For example, the connection sensor may be coupled to the base connection 110a and/or the detachable device connection 110b. Consequently, in one embodiment, the base 105 and/or the detachable device 115 may detect a connection event by way of the connection sensor. The connection sensor may be embodied as a mechanical switch, a sensor (e.g. a magnetic or capacitive sensor), electrical contacts between the base 105 and the detachable device 115, and/or the like.

In one embodiment, the base 105 may execute one or more tasks. The base 105 may use a display of the detachable device 115 to interact with a user in performing the tasks. For example, the base 105 may execute a browser displaying a Universal Resource Locator (URL). The detachable device 115 may maintain a device task list of the tasks executed by the base 105. For example, the device task list may include the URL displayed by the browser.

If the detachable device 115 is disconnected from the base 205, the detachable device 115 may execute one or more tasks from the device task list. For example, the detachable device 115 may deploy the browser and display the URL from the device task list. In one embodiment, the detachable device 115 may display the device task list and the user may select which tasks are executed.

In a certain embodiment, the user may eject the detachable device 115 before disconnecting the detachable device 115 from the base 105. As used herein, eject refers to directing an operating system to close logical connections between the base 105 and the detachable device 115. If the user ejects the detachable device 115, the base 105 may update the device task list of the detachable device 115 with all executing tasks before completing the ejection of the detachable device 115. Alternatively, the detachable device 115 may receive an update of each base task to maintain a current device task list.

In one embodiment, the base 105 is in a base inactive state when the detachable device 115 is not connected to the base 105. Alternatively, the base 105 may be used in a base active state with an external monitor when the detachable device 115 is not connected to the base 105.

Due to the separability of the detachable device 115 and the base 105 and because the base 105 and detachable device 115 may share data and have interdependent functions, the base 105 and/or detachable device 115 may identify whether they are authorized to be connected before commencing operation, certain interactions, and/or standard communication with one another. The embodiments described herein manage pairing for the base 105 and detachable device 115.

Figure 2:
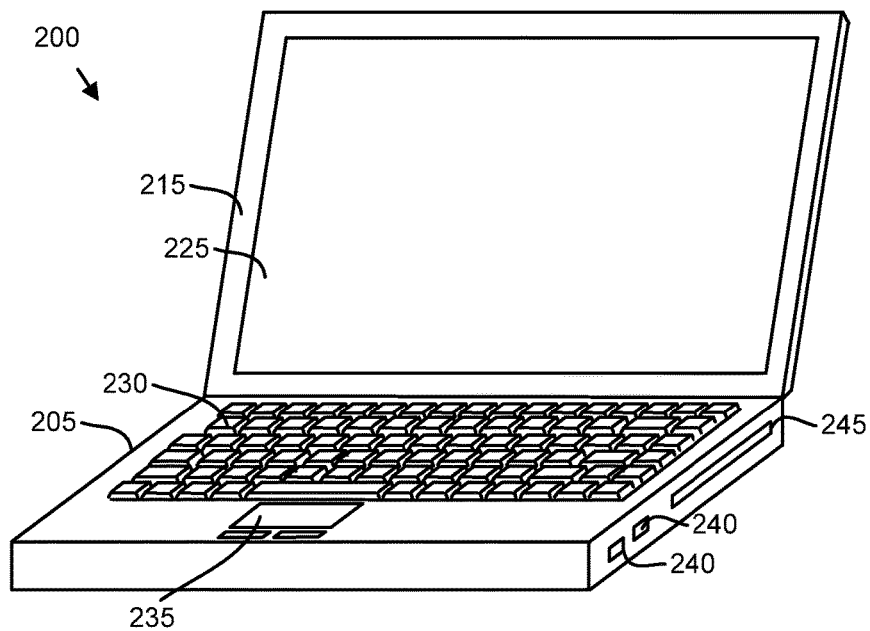
FIG. 2 is a perspective drawing illustrating one embodiment of a computer system.

FIG. 2 is a perspective drawing illustrating one embodiment of a computer system 200. The computer system 200 illustrates one embodiment of the computer system 100 of FIG. 1. In one embodiment, the computer system 200 is U1 hybrid notebook produced by Lenovo. The description of the computer system 200 refers to elements of FIG. 1, like numbers referring to like elements.

The computer system 200 includes a base 205 and a detachable device 215. The base 205 may be the base 105 of FIG. 1. In addition, the detachable device 215 may be the detachable device 115 of FIG. 1. The detachable device 215 is shown connected to the base 205. In the depicted embodiment, the base 205 includes a keyboard 230, a touchpad 235, I/O connections 240, and an optical drive 245. The I/O connections 240 may be USB connections, 1394 connections, HDMI connections, or the like.

When the detachable device 215 is connected to the base 205, the detachable device 215 may provide a display 225 for the base 205. Although, in one embodiment, the base 205 has limited use of the display 225 prior to pairing. In one embodiment, both the base 205 and the detachable device 215 include power sources such as batteries, fuel cells, and the like. In one embodiment, a power source of the base 205 may provide power to the detachable device 215 when the base 205 and the detachable device 215 are connected. Alternatively, both the power source of the base 205 and the power source of the detachable device 215 may be used concurrently.

Figure 3:
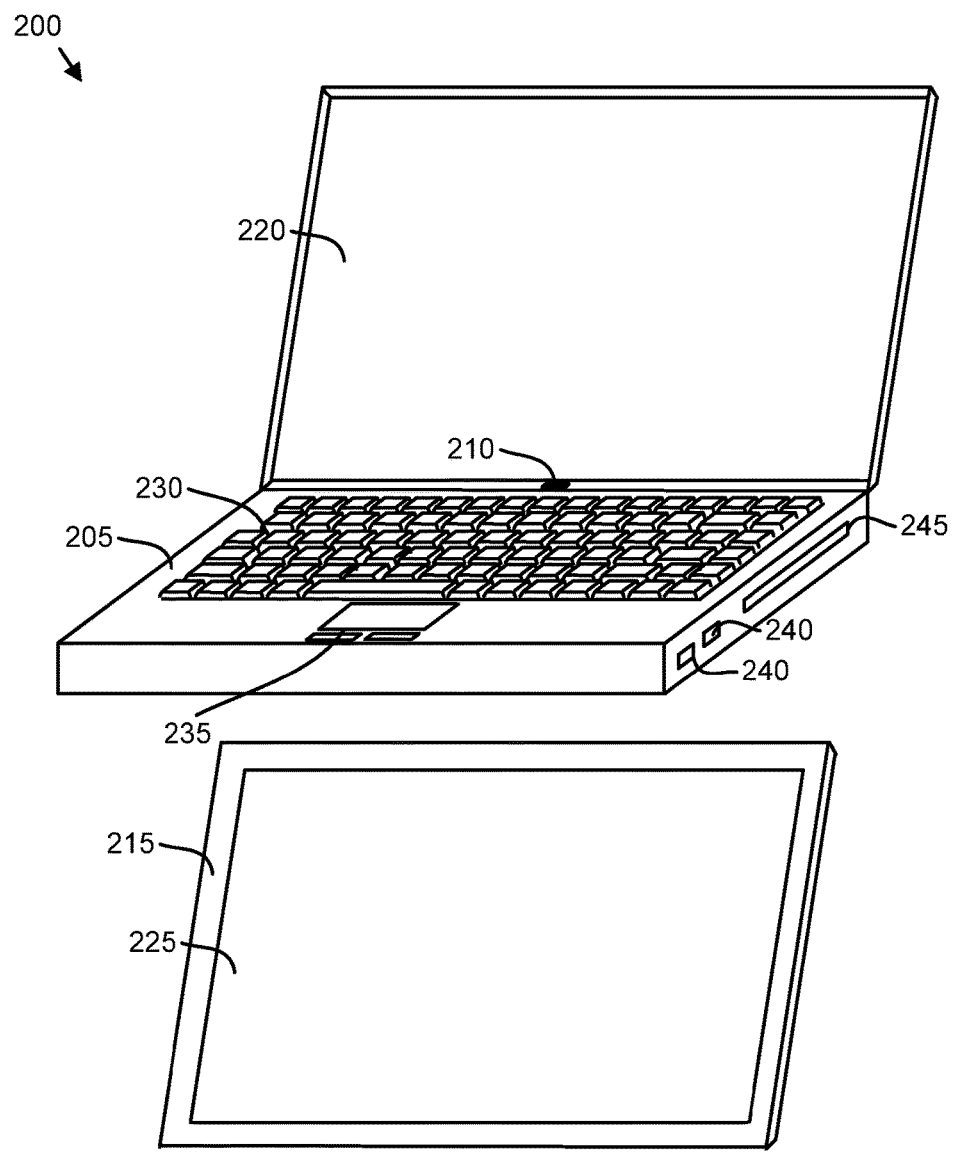
FIG. 3 is a perspective drawing illustrating one embodiment of a computer system.

FIG. 3 is a perspective drawing illustrating one embodiment of a computer system 200. The computer system 200 of FIG. 2 is shown with the detachable device 215 disconnected from the base 205. In one embodiment, the detachable device 215 connects to the base 205 through a connector 210. The description of the computer system 200 refers to elements of FIGS. 1-2, like numbers referring to like elements.

The connector 210 may be a USB connection. In an alternate embodiment, the connector 210 employs USB compliant signals through a custom connector. In addition, the connector may be a 1394 connector, a HDMI connector, and the like. In a certain embodiment, the connector 210 employs a custom interface. When the detachable device 215 is connected to the base 205, a support 220 may support the physical connection between the base 205 and a detachable device 215.

Figure 4:
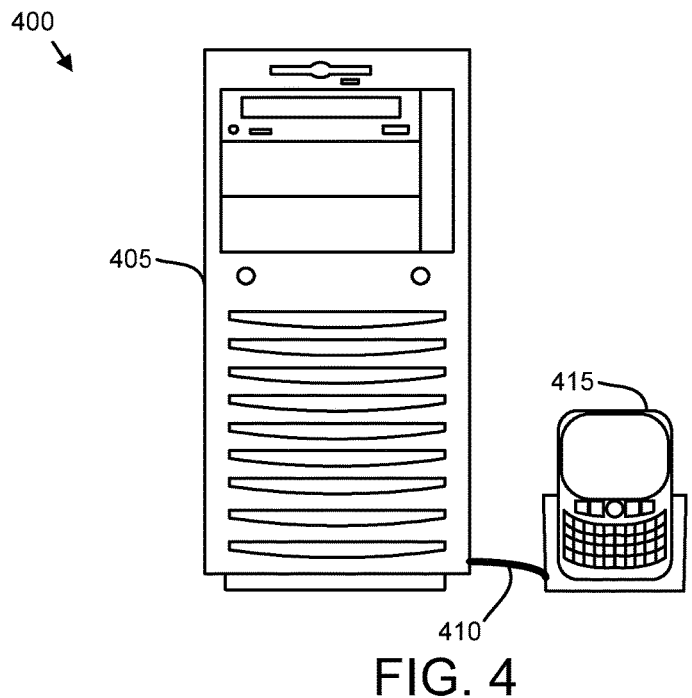
FIG. 4 is a front view drawing illustrating one alternate embodiment of a computer system.

FIG. 4 is a front view drawing illustrating one alternate embodiment of a computer system 400. The computer system 400 illustrates one embodiment of the computer system 100 of FIG. 1. The description of the computer system 400 refers to elements of FIGS. 1-3, like numbers referring to like elements.

The base 105 is depicted as a computer tower 405. The detachable device 115 is depicted as a cellular telephone 415. The connection 110 is depicted as a cable 410 such as a USB cable. One of skill in the art will recognize that the embodiments may be practiced with other combinations of devices. The detachable device 415 may provide a display and/or a network connection for the base 405.

Figure 5:
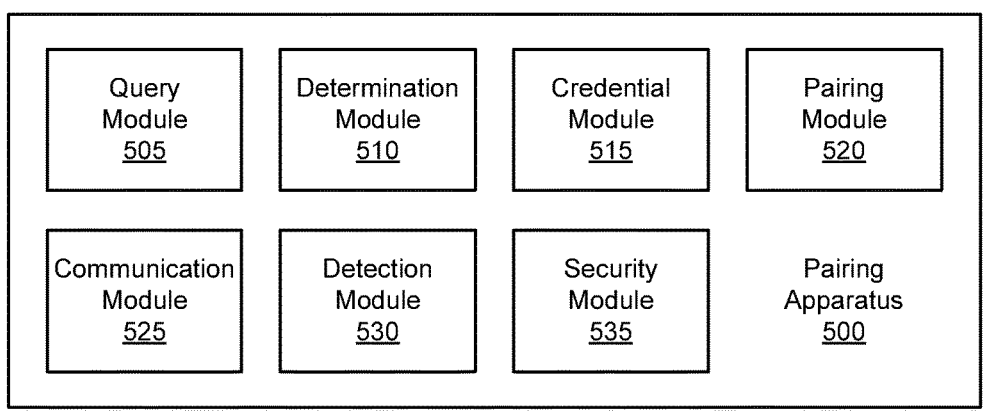
FIG. 5 is a schematic block diagram illustrating one embodiment of a pairing apparatus.

FIG. 5 is a schematic block diagram illustrating one embodiment of a pairing apparatus 500. In one embodiment, the apparatus 500 may be embodied in the base 105. In certain embodiments, the apparatus 500 may be embodied in the base 105 and in the detachable device 115. The description of the apparatus 500 refers to elements of FIGS. 1-4, like numbers referring to like elements. The apparatus 500 includes a query module 505, a determination module 510, a credential module 515, a pairing module 520, a communication module 525, a detection module 530, and a security module 535. The query module 505, determination module 510, credential module 515, pairing module 520, communication module 525, detection module 530, and/or security module 535 may comprise a computer readable storage medium storing computer readable program code executed by a processor and/or hardware circuits.

The query module 505 queries the detachable device 115 in response to the detachable device 115 connecting to the base 105. In one embodiment, querying the detachable device 115 includes requesting information about the detachable device 115 from the detachable device 115. In one embodiment, the query module 505 queries the detachable device 115 for a detachable device identifier that uniquely identifies the detachable device 115. The query module 505 may query the detachable device 115 through the connection 110. Furthermore, in certain embodiments, the query module 505 may query the detachable device 115 with a function call, according to a messaging format, and/or according to an Application Programming Interface ("API").

In one embodiment, the query module 505 receives information about the detachable device 115 in response to the query. The query module 505 may receive the detachable device identifier from the detachable device 115.

The determination module 510 determines if the detachable device 115 is paired with the base 105. In one embodiment, the determination module 510 references pairing information, which identifies one or more detachable devices 115 that are paired with the base 105. In one embodiment, the pairing information includes a list and/or database of detachable device identifiers corresponding to detachable devices 115 paired with the base 105. In one embodiment, the determination module 510 searches for the detachable device identifier in the list and determines that the detachable device 115 is paired with the base 105 in response to locating the detachable device identifier in the list that corresponds with the detachable device 115.

The credential module 515 obtains a pairing credential for a pairing in response to the determination module 510 determining that the detachable device 115 is unpaired with the base 105. The credential module 515 may trigger a user prompt for the pairing credential. The pairing credential may comprise a pairing password. In one embodiment, the credential module 515 triggers the user prompt and the operating system of the base 105 and/or another application on the base 105 displays the user prompt on the display. The prompt may include one or more fields to receive the pairing credential as text-based user input. The credential module 515 may store the user input as the pairing credential. Furthermore, in one embodiment, the credential module 515 may store and/or cause to store the pairing credential on the base 105 and on the detachable device 115. In one embodiment, the base has limited use of the display prior to pairing. In a further embodiment, the base may use the display for operations related to pairing (e.g. displaying a user prompt for a pairing credential) prior to pairing.

In one embodiment, the credential module 515 obtains the pairing credential in association with an out of box experience ("OOBE") of the operating system executing on the base 105. An OOBE refers to a procedure by an operating system or other application, presented to a user during installation and/or an initial configuration on a piece of hardware or software (e.g. a user turns on the computer system for the first time and the operating system of the base 105 performs an OOBE to set up the computer system). In one embodiment, the credential module 515, through an OOBE of the base 105 operating system, prompts a user for the pairing credential.

The pairing module 520 pairs the detachable device 115 and the base 105 in response to obtaining the pairing credential. In one embodiment, the pairing module 520 maintains a list of paired detachable devices 115 (by detachable device identifiers in one embodiment) and associated pairing credentials (e.g. passwords) in the base 105. The pairing module 520, as part of pairing the detachable device 115 and the base 105, may store the detachable device identifier and associated pairing credential in the base 105. Similarly, in one embodiment, the detachable device 115 maintains a list of paired bases 105 and associated pairing credentials.

The communication module 525 communicates a base identifier and a stored pairing credential to the detachable device 115. In one embodiment, the communication module 525 communicates the base identifier and the stored pairing credential in response to the determination module 510 determining that the detachable device 115 is paired with the base 105. The determination module 510, after finding the detachable device identifier and associated pairing credential for the pairing with the detachable device 115, may signal the communication module 525 to communicate the pairing credential associated with the pairing and a base identifier that uniquely identifies the base 105 to the detachable device 115.

The detachable device 115 may, in one embodiment, verify the base identifier and stored pairing credential. Specifically, the detachable device 115 may search pairing information stored on the detachable device 115 that includes a list of base identifiers corresponding to one or more bases 105 paired with the detachable device 115. In one embodiment, the detachable device 115 searches for the base identifier in the list and determines if a stored pairing credential matches a received pairing credential in response to locating the base identifier in the list. The detachable device 115 may communicate a successful verification response in response to verifying that the pairing credential stored at the detachable device 115 matches the received pairing credential. Alternatively, the detachable device 115 may also communicate an unsuccessful verification response if the pairing credential does not match and/or the detachable device 115 cannot locate the base identifier.

The communication module 525 may also receive the successful verification response from the detachable device 115. As stated above, the successful verification response may be sent by the detachable device 115 in response to the detachable device 115 verifying the stored pairing credential. The communication module 525 may send and receive messages to/from the detachable device 115 by way of the connection 110. Furthermore, in certain embodiments, the communication module 525 communicates with function calls, according to a messaging format, and/or according to an Application Programming Interface ("API").

The detection module 530 detects the detachable device 115 connecting to the base 105 and/or detects whether the detachable device 115 is connected to the base 105. In one embodiment, the detection module 530 detects the detachable device 115 connecting to the base 105 using a connection sensor coupled to the detachable device 115 and/or the base 105. In one embodiment, the detection module 530 monitors the connection 110 between the base 105 and the detachable device 115 to detect the connection 110.

The security module 535 may implement various security functions. In one embodiment, the security module 535 generates a public/private key pair that includes a public key and a private key. In one embodiment, the security module 535 stores the private key on the base 105. In one embodiment, the security module 535 stores and/or causes to be stored the public key on the detachable device 115. The security module 535 may encrypt information communicated to the detachable device 115 using the private key. The detachable device 115 may decrypt the encrypted information using the public key as is known in the art. In one embodiment, the security module 535 generates the public/private key pair in response to the pairing module 520 pairing the detachable device 115 and the base 105. In one embodiment, the base 105 stores the private key as the pairing credential.

In one embodiment, the security module 535 encrypts the pairing credential on the base 105 with a Trusted Platform Module (TPM). A TPM implements security specifications on a computing system by measuring integrity in the computing system, allowing a particular operating environment in the computing system to be recognizable. The TPM typically measures integrity by obtaining and storing metrics, and digests of those metrics, that measure computing system characteristics. In one embodiment, the base 105 is in communication with a TPM which the security module 535 may use to encrypt the pairing credential using metrics from the TPM that uniquely identify the base 105.

Figure 6:
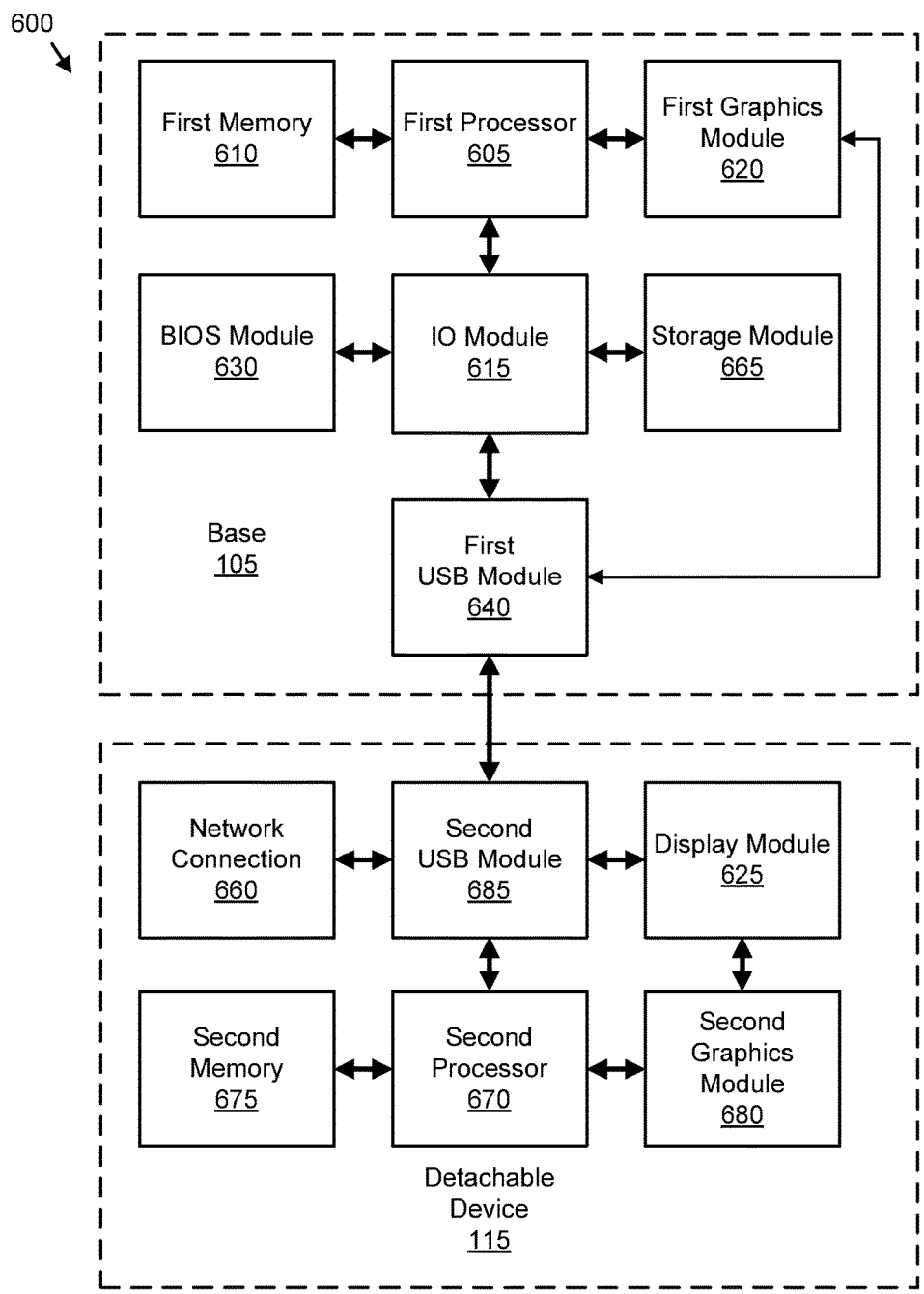
FIG. 6 is a schematic block diagram illustrating one embodiment of a base and a detachable device.

FIG. 6 is a schematic block diagram illustrating one embodiment of a base 105 and detachable device 115 of the computing system 100. The description of the base 105 and the detachable device 115 refers to elements of FIGS. 1-5, like numbers referring to like elements. The base 105 includes a first processor 605, a first memory 610, a first IO module 615, a first graphics module 620, a basic input/output system (BIOS) module 630, a first USB module 640, and a storage module 655. The detachable device 115 includes a second processor 670, a second memory 675, a second graphics module 680, a display module 625, a network connection 660, and a second USB module 685. One of skill in the art will recognize that other configurations of the computer system 100 may be employed with the embodiments described herein.

The first processor 605, first memory 610, first IO module 615, first graphics module 620, BIOS module 630, first USB module 640, second processor 670, second memory 675, second graphics module 680, display module 625, network connection 660, and second USB module 685, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The first USB module 640 may be the base connection 110a of FIG. 1. The second USB module 685 may be the detachable device connection 110b of FIG. 1. The base 105 and detachable device 115 may communicate through the first and second USB modules 640, 685.

The first memory 610 stores computer readable programs. The first memory 610 may include Dynamic Random Access Memory (DRAM), Flash memory, or the like. The first processor 605 executes the computer readable programs as is well known to those skilled in the art. The computer readable programs may be tangibly stored in the storage module 655. The storage module 655 may comprise at least one Solid State Device (SSD). In addition, the storage module 655 may include a hard disk drive, an optical storage device, a holographic storage device, a micromechanical storage device, or the like.

The first processor 605 may include an integrated cache to reduce the average time to access the first memory 610. The integrated cache may store copies of instructions and data from the most frequently used first memory 610 locations. The first processor 605 may communicate with the first memory 610 and the first graphics module 620. In one embodiment, the first processor 605 issues display commands and display data to the first graphics module 620 and the first graphics module 620 may generate rendering data for the display module 625.

In addition, the first processor 605 may communicate with the IO module 615. The IO module 625 may support and communicate with the BIOS module 630, a Peripheral Component Interconnect (PCI) bus, a Wi-Fi interface, and the like.

The BIOS module 630 may communicate instructions through the IO module 615 to boot the base 105, so that the computer readable program stored on the storage module 655 can load, execute, and assume control of the base 105. Alternatively, the BIOS module 630 may comprise a coded program embedded on a chipset that recognizes and controls various devices that make up the base 105.

The display module 625 may include the display 225 as well as additional hardware to for example decode touch inputs. When the detachable device 115 is connected to the base 105, the first graphics module 620 may communicate with the display module 625 through the first and second USB modules 640, 685. Thus the first graphics module 620 may drive the display 225 and receive inputs from the display 225.

The second memory 675 stores computer readable programs. The second memory 675 may comprise non-volatile memory devices such as Flash memory. The second processor 670 executes the computer readable programs. In one embodiment, the second processor 670 issues display commands and display data to the second graphics module 680 and the second graphics module 680 may generate rendering data for the display module 625.

In one embodiment, the detachable device 115 includes a network connection 660. The network connection 660 may communicate with a network. In one embodiment, the network is a Network Driver Interface Specification (NDIS) compliant network. In a certain embodiment, the network is a Remote NDIS (RNDIS) network. In an alternate embodiment the network is a Wireless WAN. The base 105 may communicate with the network through the network connection 660 via the first and second USB modules 640, 685.

In one embodiment, an instruction set of the first processor 605 is incompatible with an instruction set of the second processor 670. The first processor 605 may be based on an X86 instruction set and the second processor 670 may be based on an ARM instruction set.

In one embodiment, the first processor 605 and the second processor 670 may each execute a separate operating system. The first processor 605 may execute a first operating system. The first operating system may be a personal computer operating system such as a MICROSOFT WINDOWS® compatible operating system, an APPLE MACINTOSH® compatible operating system, a Linux compatible operating system, or the like. The second processor 670 may execute a second operating system. The second operating system may be a cellular telephone operating system such as an operating system based on the ANDROID® Platform Architecture, a MICROSOFT WINDOWS® compatible mobile operating system, or the like.

Figure 7:
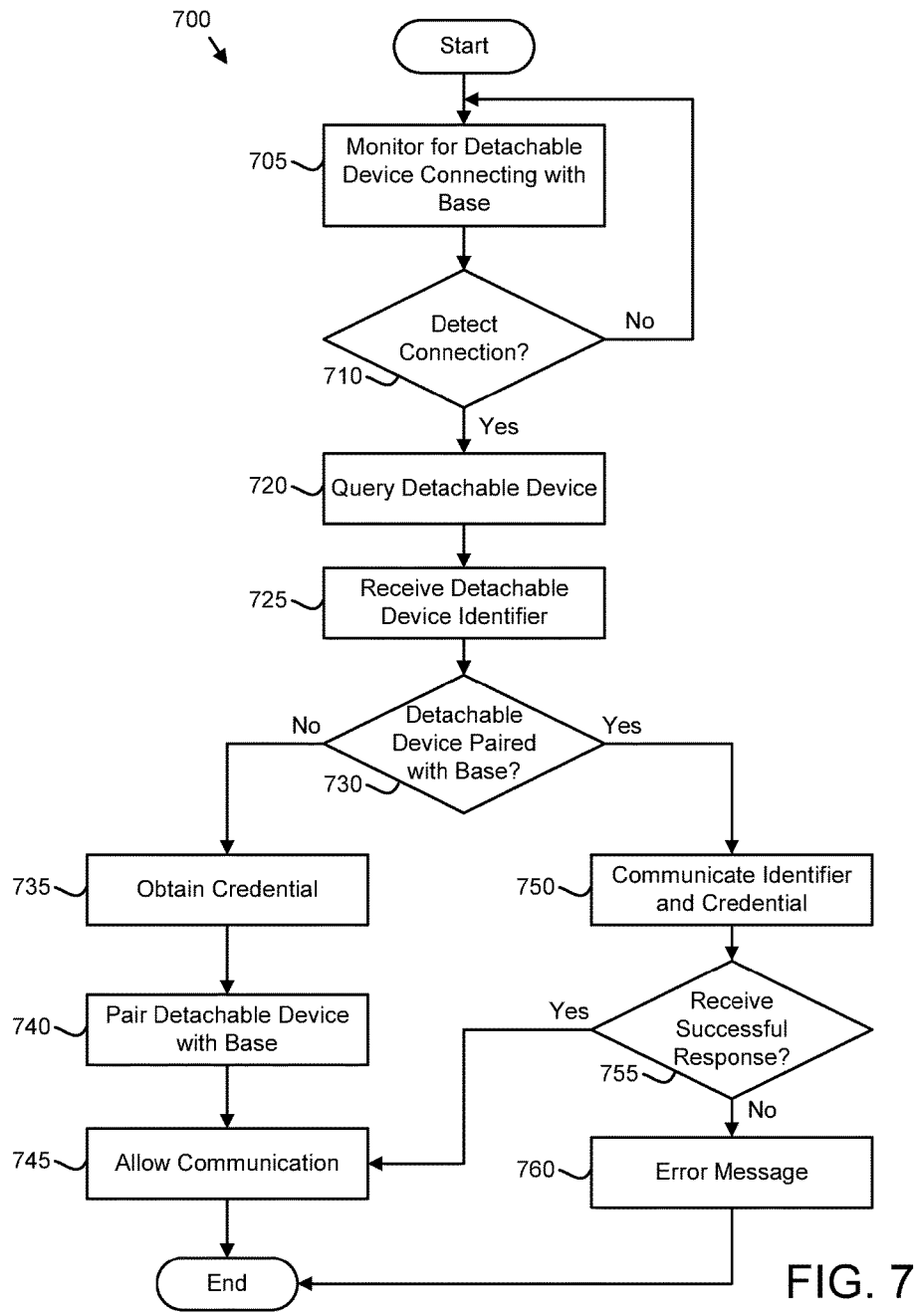
FIG. 7 is a schematic flow chart diagram illustrating one embodiment of a pairing method.

FIG. 7 is a schematic flow chart diagram illustrating one embodiment of a pairing method 700. The method 700 may perform the functions of the apparatus 500 of FIG. 5. The description of the method 700 refers to elements of FIG. 1-6, like numbers referring to like elements. The method 700 may be performed by a computer program product comprising a non-transitory computer readable storage medium and/or a storage device, such as the first memory 610 or the second memory 675, storing computer readable program code executed by a processor such as the first processor 605 or the second processor 670.

The method 700 starts, and in one embodiment, the detection module 530 monitors 705 for the detachable device 115 connecting to the base 105. The detection module 530 detects 710 if the detachable device 115 is connecting and/or is connected to the base 105. If the detection module 530 does not detect 710 a connection, the detection module 530 continues monitoring 705 for a connection between the base 105 and a detachable device 115.

If the detection module 530 detects 710 a connection, the query module 505 queries 720 the detachable device 115. The query module 505 may receive 725 a detachable device identifier from the detachable device 115 in response to the query. In one embodiment, interaction between the base 105 and the detachable device 115 is limited to operations related to pairing prior to pairing such as the query module 505 querying the detachable device 115. Next, the determination module 510 determines 730 if the detachable device 115 is paired with the base 105. The detachable device 115 may search pairing information for a detachable device identifier. If the determination module 510 determines 730 that the detachable device 115 is unpaired with the base 105 (e.g. the determination module 510 did not locate the detachable device identifier), the credential module 515 obtains 735 a pairing credential for a pairing.

In one embodiment, the credential module 515 obtains the pairing credential in association with an OOBE of the first operating system executed by the first processor 605 on the base 105. In a further embodiment, the credential module 515 obtains the pairing credential in association with an OOBE of a MICROSOFT WINDOWS® compatible operating system, an APPLE MACINTOSH® compatible operating system, a Linux compatible operating system, or the like. The pairing module 520 then pairs 740 the detachable device 115 and the base 105. In one embodiment, the pairing module 520 stores the detachable device identifier in association with the obtained pairing credential as part of pairing. Next, the pairing module 520 signals the base 105 and/or detachable device 115 to allow 745 standard communication between the base 105 and the detachable device 115 in accordance with a successful pairing and the method 700 ends.

Alternatively, if the determination module 510 determines 730 that the detachable device 115 is paired with the base 105, the communication module 525 communicates 750 a base identifier and a stored pairing credential to the detachable device 115. Next, if the communication module 525 receives 755 a successful verification response from the detachable device 115 and the communication module 525 signals the base 105 and/or detachable device 115 to allow 745 standard communication, greater interaction than available prior to pairing, communication other than for pairing, and/or the like, between the base 105 and detachable device 115 and the method 700 ends. Alternatively, if the communication module 525 does not receive 755 a successful verification response from the detachable device 115 the communication module 525 triggers 760 an error message and the method 700 ends. The communication module 525 may signal the first operating system and/or another application on the base 105 to generate an error message and/or prompt the user to re-enter the pairing credential.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a detection module, at a base, that detects a detachable device connecting to the base via a connection sensor coupled to the base, the base and the detachable device both capable of operating independently, the base including a first processor executing a first operating system and the base lacking a display, and the detachable device including a second processor executing a second operating system and a display sharable with the base;
   a query module that queries the detachable device in response to the detachable device connecting to the base, the querying including requesting a device identifier that uniquely identifies the detachable device;
   a determination module that searches a data storage on the base for pairing information belonging to the device identifier, said pairing information including a shared, user-input pairing credential, wherein the determination module determines whether the detachable device is paired with the base based on the device identifier;
   a communication module that sends the shared, user-input pairing credential and a base identifier that uniquely identifies the base to the detachable device in response to the determination module finding the detachable device identifier and associated shared, user-input pairing credential for the pairing with the detachable device,
   wherein the base executes one or more tasks and uses the display to interact with the user in performing the one or more tasks in response to connecting to and receiving a successful pairing verification response from the detachable device, and wherein the detachable device limits access by the base to the display prior to the detachable device pairing with the base, said access to the display being limited to operations for pairing the detachable device and the base; and
   a credential module that obtains a pairing credential for a pairing in response to the determination module determining that the detachable device is unpaired with the base,
   wherein obtaining the pairing credential includes the base prompting the user for the pairing credential via the display, the pairing credential being provided by the user.

2. The apparatus of claim 1, further comprising a pairing module that pairs the detachable device and the base in response to obtaining the pairing credential, wherein the pairing module permits the base to use the display in response to pairing the detachable device and the base, and wherein the pairing module permits the detachable device to access a mass storage device located at the base in response to pairing the detachable device and the base.

3. The apparatus of claim 1, wherein the further comprising a communication module receives the successful verification response from the detachable device in response to the detachable device verifying the stored pairing credential and the base station identifier match pairing information stored at the detachable device, wherein the detachable device maintains a device task list of the tasks executed by the base via the display device, wherein the base updates the device task list.

4. The apparatus of claim 1, wherein the connection sensor comprises a mechanical switch.

5. The apparatus of claim 1, further comprising a security module that generates a public/private key pair comprising a public key and a private key, stores the private key on the base, and stores the public key on the detachable device, the security module encrypting information communicated to the detachable device using the private key.

6. A method comprising:
   detecting, by use of a processor, a detachable device connecting to a base, the base and the detachable device both capable of operating independently, the base including a first processor executing a first operating system and the base lacking a display, and the detachable device including a second processor executing a second operating system and a display sharable with the base;
   querying the detachable device in response to the detachable device connecting to the base, the querying including requesting a device identifier that uniquely identifies the detachable device;
   searching a data storage on the base for pairing information belonging to the device identifier, said pairing information including a shared, user-input pairing credential;
   determining whether the detachable device is paired with the base based on the device identifier;
   sending the shared, user-input pairing credential and a base identifier that uniquely identifies the base to the detachable device in response to finding the detachable device identifier and associated shared, user-input pairing credential for the pairing with the detachable device;
obtaining a pairing credential for a pairing in response to determining that the detachable device is unpaired with the base, wherein obtaining the pairing credential includes the base prompting the user for the pairing credential via the display, the pairing credential being provided by the user; and
providing a display, at the detachable device, for the base in response to verifying the shared, user-input pairing credential and the base identifier, the display configured to allow a user to interact with the base in performing the one or more tasks executing on the first processor in response to connecting to and pairing with the detachable device, wherein the detachable device limits access by the base to the display prior to pairing, said access to the display being limited to operations for pairing the detachable device and the base.

7. The method of claim 6, further comprising pairing the detachable device and the base in response to obtaining the pairing credential.

8. The method of claim 6, further comprising maintaining, at the detachable device, a device task list of the tasks executed by the base via the display, wherein the base updates the device task list.

9. The method of claim 8, wherein the detachable device sends the successful verification response to the base in response to the detachable device verifying the stored pairing credential and the base station identifier match pairing information stored at the detachable device.

10. The method of claim 6, wherein obtaining the pairing credential further comprises obtaining the pairing credential in association with an out of box experience ("OOBE") of a first operating system executed by a first processor on the base.

11. The method of claim 6, further comprising detecting the detachable device connecting to the base using a mechanical connection sensor coupled to one or more of the detachable device and the base, wherein the mechanical connection sensor comprises a mechanical switch.

12. The method of claim 6, further comprising maintaining a list of paired detachable devices and associated pairing credentials in the base, wherein obtaining a pairing credential for a pairing in response to determining that the detachable device is unpaired with the base comprises updating the list of paired detachable devices and associated pairing credentials.

13. The method of claim 6, wherein the detachable device maintains a list of paired bases and associated pairing credentials, wherein obtaining a pairing credential for a pairing in response to determining that the detachable device is unpaired with the base comprises updating the list of paired bases and associated pairing credentials.

14. The method of claim 6, further comprising generating a public/private key pair comprising a public key and a private key, storing the private key on the base, storing the public key on the detachable device, the method further comprising encrypting information communicated to the detachable device using the private key.

15. The method of claim 6, further comprising encrypting the pairing credential on the base with a Trusted Platform Module ("TPM").

16. A computer program product comprising a storage device storing computer usable program code executable to perform operations comprising:

detecting, by use of a connection sensor, a detachable device connecting to a base, the base and the detachable device both capable of operating independently, wherein the base includes a mass storage device sharable with the detachable device and the base lacks a display, and wherein the detachable device includes a display sharable with the base;
querying the detachable device in response to the detachable device connecting to the base, the querying including requesting a device identifier that uniquely identifies the detachable device, the detachable device providing a display for the base if the detachable device and base are connected;
searching a data storage on the base for pairing information belonging to the device identifier, said pairing information including a shared, user-input pairing credential;
determining whether the detachable device is paired with the base from the pairing information;
sending the shared, user-input pairing credential and a base identifier that uniquely identifies the base to the detachable device in response to finding the detachable device identifier and associated shared, user-input pairing credential for the pairing with the detachable device, wherein the base uses the display to interact with the user in performing one or more tasks in response to connecting to and receiving a successful pairing verification response from the detachable device;
obtaining a pairing credential for a pairing in response to determining that the detachable device is unpaired with the base, wherein obtaining the pairing credential includes the base prompting the user for the pairing credential via the display, the pairing credential being provided by the user; and
providing the detachable device with access to the mass storage device in response to determining that the detachable device is paired with the base, wherein the detachable device limits access by the base to the display prior to the detachable device pairing with the base, said access to the display being limited to operations for pairing the detachable device and the base.

17. The computer program product of claim 16, the operations further comprising maintaining, at the detachable device, a device task list of the tasks executed by the base via the display, wherein the base updates the device task list.

18. The computer program product of claim 16, wherein the successful verification response is sent by the detachable device in response to the detachable device verifying the stored pairing credential and the base station identifier match pairing information stored at the detachable device.

19. The computer program product of claim 16, wherein the base comprises a first processor executing a first operating system and the detachable device comprises a second processor executing a second operating system other than the first operating system and a network connection to a network, wherein the base connects to the network through the network connection.

20. The computer program product of claim 19, wherein the first operating system is a personal computer operating system and the second operating system is a cellular telephone operating system.

* * * * *